United States Patent [19]

Baur et al.

[11] 4,399,111

[45] Aug. 16, 1983

[54] PROCESS FOR REMOVAL OF SOUR GASES BY SCRUBBING

[75] Inventors: Karl Baur, Baierbrunn; Eberhard Lassmann, Eurasburg; Heinz Karwat, Pullach, all of Fed. Rep. of Germany

[73] Assignee: Linde Aktiengesellschaft, Wiesbaden, Fed. Rep. of Germany

[21] Appl. No.: 368,252

[22] Filed: Apr. 14, 1982

[30] Foreign Application Priority Data

Apr. 29, 1981 [DE] Fed. Rep. of Germany ....... 3117084

[51] Int. Cl.³ .............................................. B01D 53/34
[52] U.S. Cl. .................................... 423/226; 423/223; 423/228; 423/232; 423/245; 423/246; 423/421; 423/437
[58] Field of Search ............... 423/223, 228, 229, 232, 423/233, 245, 421, 436, 246

[56] References Cited

U.S. PATENT DOCUMENTS 3,054,653  9/1962  Barton et al. ........................ 423/245
3,086,838  4/1963  Giammarco ......................... 423/223
3,907,969  9/1975  Field ................................... 423/232

FOREIGN PATENT DOCUMENTS 1084425  6/1960  Fed. Rep. of Germany ...... 423/229

*Primary Examiner*—Earl C. Thomas
*Attorney, Agent, or Firm*—Millen & White

[57] ABSTRACT

In the removal of sour gases by scrubbing with an aqueous alkali metal salt solution, e.g. a solution of $K_2CO_3$, the circulating scrubbing liquid is gradually contaminated with organic acids, especially formic acid, which in turn ties up $K^+$ as the formate which is ineffective for scrubbing purposes. To remove the organic acids, at least a partial stream of the circulating scrubbing liquid is subjected to an oxidation step under conditions leading to the oxidation of the salts of the organic acids, thereby liberating the bound alkali metal ions. If the scrubbing liquid contains an oxidizable activator, the latter can be extracted prior to oxidation of the scrubbing liquid and added back subsequent to the oxidation.

18 Claims, 2 Drawing Figures

PROCESS FOR REMOVAL OF SOUR GASES BY SCRUBBING

BACKGROUND OF THE INVENTION

The present invention relates to a process for scrubbing out sour gases, especially $CO_2$, or $CO_2$ in admixture with $H_2S$, from gaseous mixtures with an aqueous solution of a salt of an alkali metal and a weak inorganic acid, which solution is subjected to regeneration after absorption of the sour gases, and is subsequently reused.

Such a scrubbing process has been disclosed, for example, in German Pat. No. 1,084,425. In this patented process, sour gases, especially $CO_2$, are converted with a potassium carbonate solution, during the scrubbing stage, into potassium bicarbonate; in the regenerating stage, the pressure is reduced, the reaction is reversed, and the carbon dioxide is withdrawn from the head of the regenerating column. To improve the absorption capacity of the scrubbing liquid, an activator (e.g. an ethanolamine) can be added to the potassium carbonate solution. Furthermore, it proved to be advantageous to also admix a vanadate to the scrubbing liquid to act as a corrosion inhibitor. This scrubbing method is distinguished by the ease of regeneration of the scrubbing medium. However, it has the disadvantage that substantial makeup circulating scrubbing liquid is required due to the gradual decrease in the absorption capacity of the scrubbing liquid. Other references relating to this process are, for example, US-PS 3,907,969.

SUMMARY OF THE INVENTION

An object of the present invention is to provide a regenerating method minimizing the losses of scrubbing liquid and in this way reducing the operating costs of the process.

Upon further study of the specification and appended claims, further objects and advantages of this invention will become apparent to those skilled in the art.

It has been found that the reason for the loss of absorption capacity of the scrubbing liquid is that organic acids, principally formic acid, are formed during the scrubbing step or are introduced in the raw gas. These organic acids bind the alkali metal cation, e.g. potassium, as relatively non-dissociable salts, and the cations are therefore in effect removed from the scrubbing liquid which in turn lowers the quantity of $K_2CO_3$, for example, in the scrubbing liquid.

To attain the objects of the invention, at least a part of the circulating scrubbing liquid is subjected to oxidation after the scrubbing step. The oxidation is conducted under such conditions that result in the oxidation of the organic acids, thereby liberating the bound cations and resulting in a replenishment of $K_2CO_3$ for example. The replenished scrubbing liquid is then available for absorption.

If the scrubbing liquid contains a vanadate as the corrosion inhibitor, this compound likewise loses effectiveness insofar as the vanadium therein is gradually reduced by the organic acids into the undesirable oxidation stage $+IV$. By the oxidation step of this invention, the reduced vanadium is reoxidized to stage $+V$, which is suitable for corrosion inhibition. Furthermore, the alkali metal bicarbonate, formed by the absorption of $CO_2$, for example, as reacted during the oxidation step in a reverse direction, i.e., back to alkali carbonate, water, and $CO_2$. Consequently, the scrubbing medium is truly regenerated with respect to alkali metal cation, alkali carbonate, and vanadate $+V$. In view of the recovery of the components of the scrubbing medium previously bound as salts of the organic salts, not only are the operating costs of the scrubbing process considerably reduced, but also raw material waste and environmental pollution are likewise diminished.

To oxidize the organic acids effectively, the conditions of oxidation must be such that the alkali metal cations are liberated. It is advantageous in one aspect of the invention to subject the scrubbing liquid to wet oxidation. In this connection, the wet oxidation is conducted according to a preferred embodiment of the process of this invention for 15-180 minutes, preferably 30-60 minutes, at temperatures of 100°-375° C., preferably 150°-330° C., and under an oxygen partial pressure of 0.2-100 bar, preferably of 10-30 bar.

Alternatively, according to another advantageous embodiment, the scrubbing liquid can also be subjected to a dry oxidation. For this purpose, it is suitable to evaporate the scrubbing liquid to dryness, heat the resultant solids in the presence of an oxygen-containing gas, and to subsequently redissolve the resultant oxidized solids in water. According to a preferred embodiment, the dry oxidation is conducted for 10-100 minutes, preferably 30-60 minutes, at temperatures of 250°-700° C., preferably 550°-650° C. Air can advantageously be employed as the oxygen-containing gas.

If the scrubbing liquid contains an activator, especially diethanolamine, this activator, according to another advantageous embodiment of the process of this invention, can be extracted prior to oxidation of the scrubbing liquid and reintroduced into the latter after oxidation. Suitable extractants are, in particular, 1-butanol and 2-butanol, but other extractants can also be used in accordance with conventional solvent extraction technology.

The process of this invention can be applied with special advantage to the hot potash method, but it can also be utilized in other scrubbing processes employing solutions containing alkali metal borate, phosphate, or arsenite as the scrubbing medium.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

Under a pressure of 45 bar and at a temperature of 105°-110° C., 298,000 $Nm^3/h$ of raw gas is introduced into a scrubbing column. The raw gas has the following composition:

| | |
|---|---|
| $H_2$ | 50 vol-% |
| CO | 5 vol-% |
| $CH_4$ | 32 vol-% |
| $C_nH_m$* | 3 vol-% |
| $CO_2$ | 10 vol-% |
| Carboxylic acids (traces) | 2-3 vol-ppm |

*$C_nH_m$ represents paraffinic and olefinic hydrocarbons

The raw gas is contacted in the scrubbing column by downwardly trickling scrubbing liquid, for example an aqueous potassium carbonate solution having a concentration in weight percent of 10 to 35, preferably 25 to 30, so that, in a manner known per se, almost the entire $CO_2$ is absorbed by the scrubbing liquid in accordance with the reaction $$K_2CO_3 + CO_2 + H_2O \rightarrow 2\ KHCO_3 \quad (I)$$

The scrubbed gas exits from the scrubbing column with a content of 0.3 vol-% $CO_2$.

However, the traces of carboxylic acids contained in the gas are also absorbed from the gas in the scrubbing column. Further, a small amount of formic acid is continuously formed by the carbon monoxide contained in the gas, together with water in accordance with the reaction

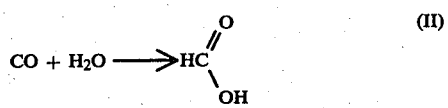

This formic acid reacts with the potash under $CO_2$ separation in accordance with the equation $$K_2CO_3 + 2\ HCOOH \rightarrow 2\ HCOOK + CO_2 + H_2O \quad (III)$$

The salts of the organic acids are bound more firmly than those of carbonic acid so that alkali carbonate is constantly being lost and is unavailable for the $CO_2$ absorption step according to reaction (I).

In industrial installations, for example, it is possible that, after 30 weeks, about 30% of the alkali metal ions have been neutralized by carboxylic acids. With a quantity of potash in the system of, for instance, 500 tons of solution (corresponding to 400 m³) with a $K_2CO_3$ content of 250 g/kg, equaling 125 tons of potash, 37.5 tons (corresponding to 272 kg-mol) has thus been neutralized after 30 weeks. From this can be concluded that the entrained amount of acid is 272 kg-equivalents or 54 gram equivalent/hour.

In the sour gas scrubbing process, the process generally cannot tolerate more than 20% inactivation of alkali metal ions by the carboxylic acids. From this, the partial stream of the scrubbing liquid which is to be subjected to oxidation, necessary in a continuous steady state operation, can be calculated as follows:

The scrubbing liquid contains 250 g $K_2CO_3$/kg (=3.62 eg. $K^+$/kg). 20% of the alkali metal ions (=0.724 eg. $K^+$/kg solution) is available for neutralization by the carboxylic acid. 54 eq. of carboxylic acids/h is entrained in the feed. As a consequence, $$\frac{54}{0.724} = 74.6\ kg$$

of solution/h must be replaced.

The partial stream of the scrubbing liquid to be subjected to an oxidation is of the following composition:

| | kg/h | % by weight |
|---|---|---|
| $K_2CO_3$ | 14.9 | 19.65 |
| $KVO_3$ | 0.5 | 0.69 |
| DEA | 3.0 | 3.94 |
| K (OOCH) | 2.7 | 3.54 |
| K (ac + higher carboxylic acids) | 2.3 | 3.04 |
| Water | 52.6 | 69.14 |
| | 76.0 | 100.00 |

Consequently, at least 76 kg/h of scrubbing liquid (=about 61 l/h) must thus be subjected to oxidation.

In the example, the scrubbing liquid contains diethanolamine as the activator, of which about 3.0 kg is present in the partial stream. This activator would be destroyed during the oxidation, but by reason of economics, it is preferred that it be preserved. It has thus been proven to be advantageous to extract the activator prior to oxidation and readmix same to the scrubbing liquid after the oxidation. The partial stream of scrubbing liquid to be oxidized is conveyed into a countercurrent extraction tower with the aid of a metering pump. In a conventional manner, 50 l/h of diethanolamine-free extractant, preferably 1-butanol or 2-butanol, is fed from the bottom into the tower, rising in the tower countercurrently to the potash solution, which has a higher specific gravity, and being brought into intimate contact during this time with the descending scrubbing liquid due to the packing or plates or baffles within the tower. From the head of the extraction tower, 55 l/h of water-containing and diethanolamine-containing extractant is withdrawn. The sump product is 56 l/h of potash solution containing maximally 0.3% by weight of diethanolamine. The extractant is processed by rectification; the separated diethanolamine is readmixed to the potash solution as an activator after the oxidation.

If another compound, for example ethylenediamine, is added to the scrubbing liquid as the activator, the extraction is conducted in the same way, but optionally with another extractant.

The partial stream of scrubbing liquid—optionally freed of activator—is subjected to an oxidation according to this invention for regeneration purposes.

DETAILED DESCRIPTION

Figure 1:
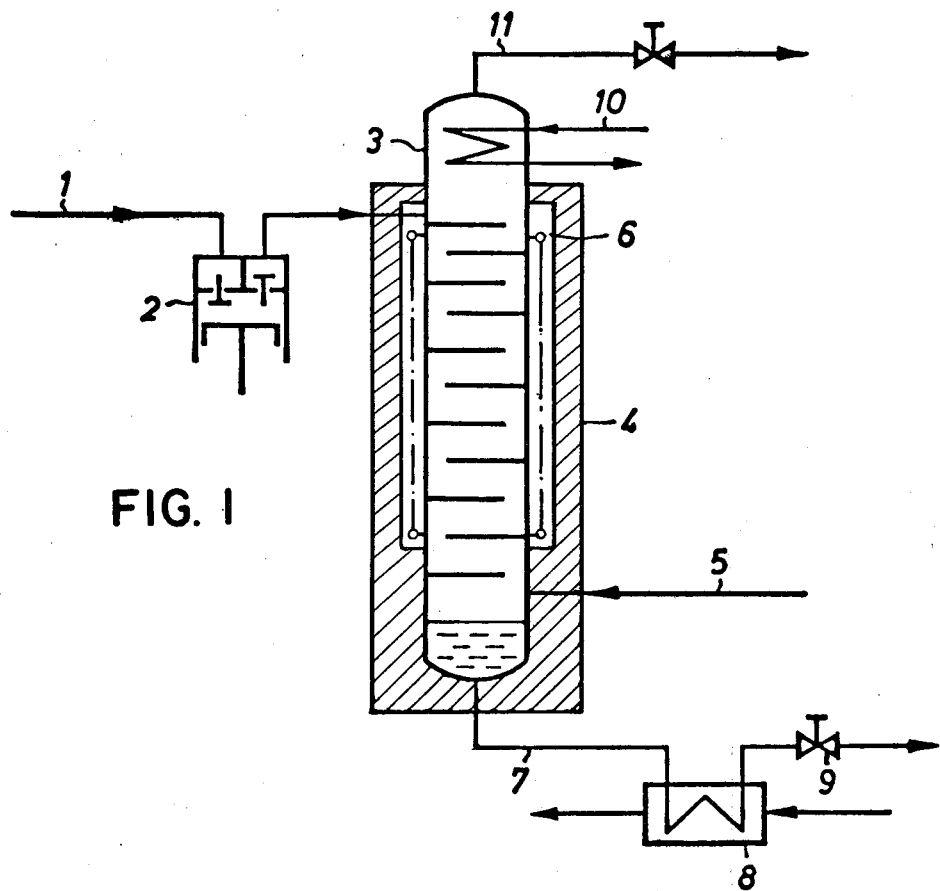
FIG. 1 is a schematic illustration of a system and apparatus encompassing a comprehensive preferred embodiment of the invention wherein wet oxidation is employed.

In FIG. 1, the $K_2CO_3$ depleted scrubbing liquid passes via a conduit 1 with a pump 2, e.g., a high-pressure metering pump, in an amount of 61 l/h (or 56 l/h after removal of the activator) to the head of an oxidizing column 3, constructed as a bubble column and provided with insulation 4. Via conduit 5, an air stream of 30 Nm³/h enters the bubble column 3. The pressure in the column is, for example, 140 bar. The temperature is kept constant (by installed heating elements 6) at 300°–330° C. During a time period of about one hour, the scrubbing liquid passes through the bubble column 3 from the top toward the bottom. During this time, the salts of the organic acids are oxidized to $CO_2$ and $H_2O$ and in this way, the alkali metal ions are liberated so that the original scrubbing liquid can be reconstituted.

The scrubbing liquid leaves the bubble column 3 via conduit 7 at the sump of the column, is cooled against cooling water in a heat exchanger 8, and is finally pressure reduced via a valve 9 and reintroduced into the scrubbing cycle. The exhaust air stream exits, after cooling in 10, via conduit 11 from the head of the bubble column 3 at a temperature of about 30° C.

An analysis of the scrubbing liquid exiting from the bubble column indicates a formic acid content lower than 0.1% by weight, and an acetic acid content lower than 0.02% by weight. Higher carboxylic acids can no longer be detected (less than 0.02% by weight). The vanadium present in the example in the scrubbing liquid and having passed over into the undesired oxidation stage +IV has been practically completely reconstituted, by the oxidation, to oxidation stage +V desirable for corrosion inhibition.

Figure 2:
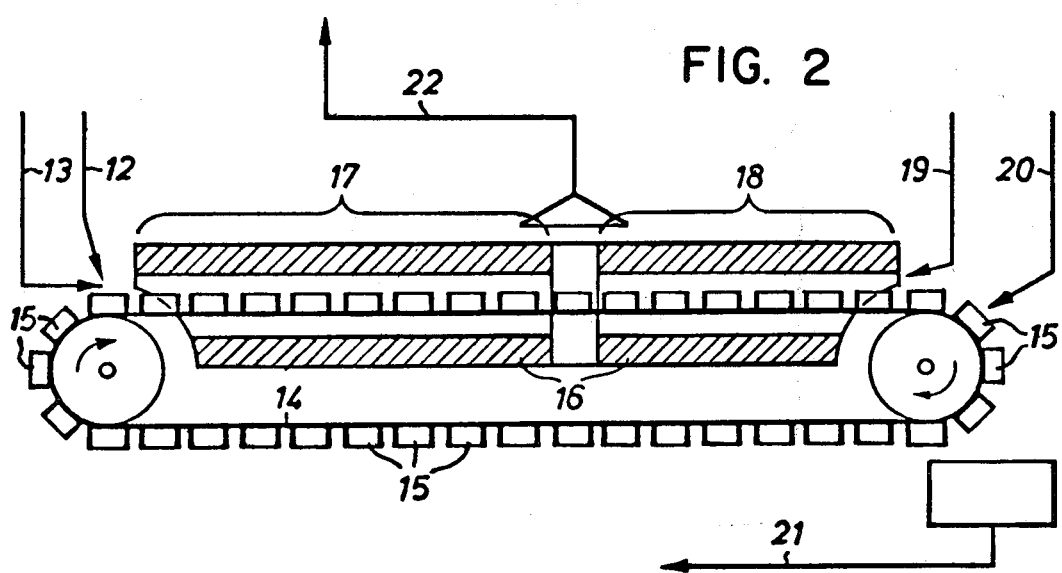
FIG. 2 is a schematic illustration of a system and apparatus encompassing a comprehensive preferred embodiment of the invention wherein dry oxidation is employed.

In FIG. 2, the $K_2CO_3$ depleted scrubbing liquid is injected via a conduit 12 together with an inert gas from conduit 13 into buckets 15 fixedly mounted on a conveyor belt 14. The conveyor belt 14 passes through a tubular furnace 16 consisting of two sections. In the first section 17 of the tubular furnace, having a maximum temperature of, for example, 300° C., the scrubbing liquid is evaporated to dryness, i.e. the water and any diethanolamine present are vaporized. The inert gas concomitantly fed via conduit 13 serves as the purge gas and prevents oxidation of any diethanolamine present.

The first section 17, serving as the evaporation zone, is followed by an oxidation zone in the form of a second section 18 of the tubular furnace 16. At an oxidizing temperature of, for example, 650° C. and a residence time of one hour, 98% of the salts of the organic acids is oxidized in the presence of an oxygen-containing gas, e.g. air, blown into this section 18 via conduit 19. The entire amount of potassium bicarbonate is reacted to potassium carbonate, $H_2O$, and $CO_2$, and the existing vanadium is reoxidized to the oxidation stage +V desired for corrosion inhibition.

After exiting from the tubular furnace 16, water is admixed via a conduit 20 to the evaporated and oxidized salts, and the regenerated scrubbing liquid is discharged via conduit 21. The inert gas from the evaporation zone 17 and the gas from the oxidation zone 18 are removed from the tubular furnace 16 via conduit 22. Instead of dissolving the salts in fresh water, it is also possible to use for this purpose, condensate containing diethanolamine obtained from conduit 22 by cooling of the exiting gas-vapor mixture.

A tunnel kiln or a combustion furnace in a reducing or oxidizing atmosphere can also be employed, for example, in place of a tubular furnace.

The dry oxidation method can also be conducted with intermittently operating evaporation and oxidizing devices.

Solutions which contain alkali borate, phosphate, or arsenite can also be employed, for example, as the scrubbing liquids.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a continuous process for removing sour gas comprising $H_2S$ and/or $CO_2$ from a gaseous mixture, which process comprises scrubbing the gaseous mixture with an aqueous solution comprising a salt of an alkali metal and a weak inorganic acid as the scrubbing liquid; subjecting resultant loaded scrubbing liquid to regeneration by pressure reduction; and recycling regenerated scrubbing liquid to the scrubbing stage, the improvement wherein carboxylic acids are introduced with the gaseous mixture in trace amounts and/or are formed during the scrubbing stage, and form salts with alkali metal cations in the scrubbing liquid, and which comprises subjecting a continuous partial stream of the scrubbing liquid to an oxidation step under conditions sufficient to liberate alkali metal cations from the salts of said carboxylic acids contained in the scrubbing liquid to reconstitute the scrubbing liquid with said salt of an alkali metal and a weak inorganic acid.

2. A process according to claim 1, wherein the gaseous mixture contains CO, the sour gas comprises $CO_2$, the scrubbing liquid is a solution of potassium carbonate, the carboxylic acid is formic acid formed by the reaction of CO and $H_2O$ in the scrubbing stage, and the oxidation of the formic acid results in the formation of $CO_2$ and $H_2O$.

3. A process according to claim 1 or claim 2, wherein the oxidation is conducted in the liquid phase for 15-180 minutes at temperatures of 100°-375° C. and under an oxygen partial pressure of 0.2-100 bar.

4. A process according to claim 1 or claim 2, wherein the oxidation is conducted in the liquid phase for 30-60 minutes at temperatures of 150°-330° C. and under an oxygen partial pressure of 10-30 bar.

5. A process according to claim 2, wherein the oxidation step comprises evaporating the scrubbing liquid to dryness, heating the resultant solid in the presence of an oxygen-containing gas, and subsequently redissolving resultant oxidized solids in water.

6. A process according to claim 5, wherein the oxidation is conducted by heating for 10-100 minutes at temperatures of 250°-700° C.

7. A process according to claim 5, wherein the oxidation is conducted by heating for 30-60 minutes at temperatures of 550°-650° C.

8. A process according to claim 2, wherein the scrubbing liquid further comprises an oxidizable activator, the further steps of solvent extracting the activator prior to oxidation of the scrubbing liquid, and reintroducing the activator into the scrubbing liquid after the oxidation.

9. A process according to claim 8, wherein the activator and is diethanolamine.

10. A process according to claim 9, wherein the solvent is 1-butanol or 2-butanol.

11. A process according to claim 1, wherein the scrubbing liquid further comprises an oxidizable activator, the further steps of solvent extracting the activator prior to oxidation of the scrubbing liquid, and reintroducing the activator into the scrubbing liquid after the oxidation.

12. A process according to claim 11, wherein the activator is diethanolamine.

13. A process according to claim 12, wherein the solvent is 1-butanol or 2-butanol.

14. A process according to claim 2, said partial stream of loaded scrubbing liquid further comprising potassium bicarbonate and +IV vanadium and wherein said oxidation step converts the potassium bicarbonate to potassium carbonate and +IV vanadium to +V vanadium.

15. A process according to claim 2, wherein said gaseous mixture is predominantly hydrogen.

16. In a process for removing $CO_2$ from a gaseous mixture comprising CO and $CO_2$, which process comprises scrubbing the gaseous mixture with an aqueous solution of potassium carbonate and an activator to improve the absorption capacity of the aqueous solution, said activator being oxidizable; subjecting resultant loaded scrubbing liquid to regeneration; and recycling regenerated scrubbing liquid to the scrubbing stage, the improvement comprising subjecting at least a partial stream of the scrubbing liquid containing a potassium salt of formic acid, the latter being formed by the reaction of CO and $H_2O$ in the scrubbing stage, to an oxidation step under conditions sufficient to liberate the potassium cation from the potassium salt of formic acid in order to reconstitute the scrubbing liquid with potassium carbonate.

17. A process according to claim 16, wherein the activator is diethanolamine.

18. A process according to claim 17, wherein the solvent is 1-butanol or 2-butanol.

* * * * *